(12) United States Patent
Ishikawa et al.

(10) Patent No.: US 8,455,142 B2
(45) Date of Patent: Jun. 4, 2013

(54) NON-AQUEOUS ELECTROLYTE AND NON-AQUEOUS ELECTROLYTE SECONDARY BATTERY USING THE SAME

(75) Inventors: Hitoshi Ishikawa, Sendai (JP); Yasutaka Kono, Sendai (JP); Koji Utsugi, Sendai (JP); Yoko Hashizume, Sendai (JP); Shinako Kaneko, Sendai (JP); Hiroshi Kobayashi, Sendai (JP)

(73) Assignee: NEC Energy Devices, Ltd., Sagamihara-shi (JP)

( * ) Notice: Subject to any disclaimer, the term of this patent is extended or adjusted under 35 U.S.C. 154(b) by 592 days.

(21) Appl. No.: 12/419,486

(22) Filed: Apr. 7, 2009

(65) Prior Publication Data
US 2009/0253049 A1 Oct. 8, 2009

(30) Foreign Application Priority Data
Apr. 7, 2008 (JP) ................... 2008-099224

(51) Int. Cl.
*H01M 6/16* (2006.01)
(52) U.S. Cl.
USPC ........... 429/327; 429/329; 429/330; 429/332; 429/333; 429/334; 429/335; 429/336; 429/340; 429/200; 429/231.1; 429/224; 429/231.95; 429/231.8; 252/62.2
(58) Field of Classification Search
USPC ............... 429/327, 329, 330, 332, 333, 334, 429/335, 336, 340, 200, 231.1, 224, 231.95, 429/231.8; 252/62.2
See application file for complete search history.

(56) References Cited

U.S. PATENT DOCUMENTS

| | | | |
|---|---|---|---|
| 4,950,768 A | 8/1990 | Cronyn | |
| 2007/0054179 A1 | 3/2007 | Kusachi et al. | |
| 2007/0212613 A1 | 9/2007 | Ishida et al. | |

FOREIGN PATENT DOCUMENTS

| EP | 1394888 A1 | 3/2004 |
|---|---|---|
| JP | 60-154478 A | 8/1985 |
| JP | 62-100948 A | 5/1987 |
| JP | 63-102173 A | 5/1988 |
| JP | 4-169075 A | 6/1992 |
| JP | 5-74486 A | 3/1993 |
| JP | 5-82138 A | 4/1993 |
| JP | 5-44946 B | 7/1993 |
| JP | 5-234583 A | 9/1993 |
| JP | 5-275077 A | 10/1993 |
| JP | 6-52887 A | 2/1994 |
| JP | 7-122296 A | 5/1995 |
| JP | 7-302617 A | 11/1995 |
| JP | 8-45545 A | 2/1996 |
| JP | 8-250108 A | 9/1996 |
| JP | 10-189041 A | 7/1998 |
| JP | 11-260401 A | 9/1999 |
| JP | 11-288706 A | 10/1999 |
| JP | 11-339850 A | 12/1999 |
| JP | 2000-3724 A | 1/2000 |
| JP | 2000-123868 A | 4/2000 |
| JP | 2000-208169 A | 7/2000 |
| JP | 2000-235866 A | 8/2000 |
| JP | 2000-294278 A | 10/2000 |
| JP | 2001-35530 A | 2/2001 |
| JP | 2004-281325 | * 10/2004 |
| JP | 2004-281325 A | 10/2004 |
| JP | 2000-138071 A | 5/2006 |
| JP | 2008-71559 A | 3/2008 |
| JP | 2008-153118 A | 7/2008 |
| JP | 2009-16232 A | 1/2009 |
| WO | 85-03075 A1 | 7/1985 |

OTHER PUBLICATIONS

Abstracts of the 41st Battery Symposium in Japan, section 1E03; Nagoya, Japan, Nov. 20-22, 2000.
Abstracts of the 2000th Fall Meeting of the Electrochemical Society of Japan, section 2A24; Japan, 2000.
European Search report dated Aug. 3, 2009, issued in corresponding European Patent Application No. 09157398.0.
Xu, M. Q. et al.: "Performance improvement of lithium ion battery using PC as a solvent component and BS as an SEI forming additive"; Journal of Power Sources, 2007, pp. 705-710, vol. 174, No. 2, pp. 705-710.
The 41st Battery Symposium in Japan; Nagoya, Japan, Nov. 20-22, 2000.

* cited by examiner

*Primary Examiner* — Laura Weiner
(74) *Attorney, Agent, or Firm* — Westerman, Hattori, Daniels & Adrian, LLP

(57) ABSTRACT

A non-aqueous electrolyte can suppress decomposition of a solvent, improve the cycle life of a secondary battery, suppress the rise of resistance of a secondary battery and improve the capacity maintenance ratio of a secondary battery. A non-aqueous electrolyte secondary battery formed by using such a non-aqueous electrolyte includes a non-aqueous electrolyte containing an aprotic solvent and a disulfonic acid ester as expressed by chemical formula 1 shown below, a positive electrode and a negative electrode:

Chemical formula 1

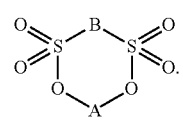

16 Claims, 1 Drawing Sheet

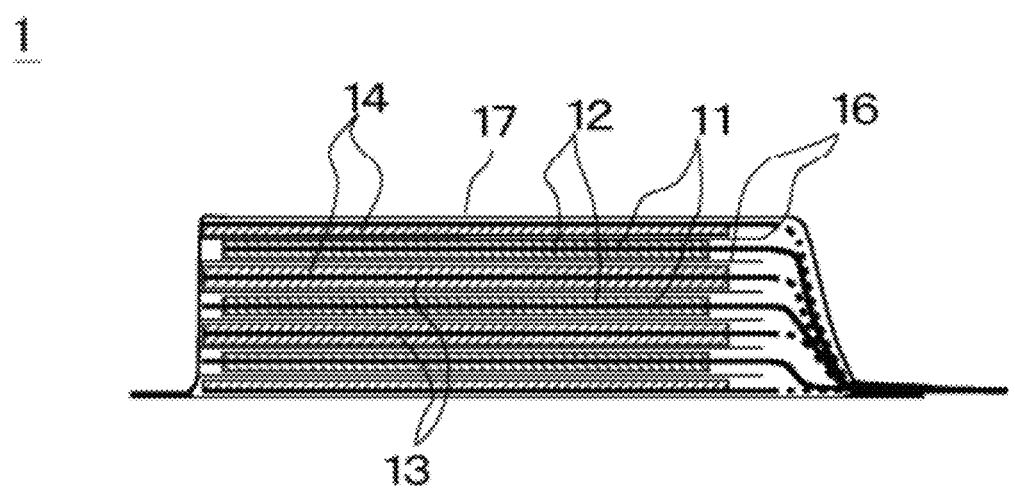

NON-AQUEOUS ELECTROLYTE AND NON-AQUEOUS ELECTROLYTE SECONDARY BATTERY USING THE SAME

CROSS-REFERENCE TO RELATED APPLICATIONS

This application is based upon and claims the benefit of priority from prior Japanese Patent Application No. 2008-99224, filed Apr. 7, 2008, the entire contents of which are incorporated herein by reference.

BACKGROUND OF THE INVENTION

This invention relates to a non-aqueous electrolyte to be used for secondary batteries and also to a non-aqueous electrolyte secondary battery using the same.

Non-aqueous electrolyte lithium ions and lithium secondary batteries formed by using a carbon material, an oxide, a lithium alloy or lithium metal for the negative electrode have been attracting attention as power sources for portable telephone sets, notebook type personal computers and so on because they can realize a high energy density. It is known that a film referred to as surface film, protective film or solid electrolyte interface (SEI) or simply as film (to be referred to as "surface film" hereinafter) tends to be formed on the surface of the negative electrode. It is also known that such a surface film indispensably needs to be rigorously controlled to improve the performance of the negative electrode because it significantly influences the charge-discharge efficiency, the cycle life and the safety of the battery. As for prior art secondary batteries of the type under consideration, the irreversible capacity of the carbon material or the oxide material of the negative electrode needs to be reduced and, in the case of a lithium metal negative electrode or a lithium alloy negative electrode, both the problem of fall of the charge-discharge efficiency and that of safety due to generation of dendrite need to be solved.

Various techniques have been proposed to dissolve the above-identified problems. For example, there are proposed techniques for suppressing generation of dendrite by arranging a film layer of lithium fluoride on the surface of the lithium metal or the lithium alloy of the negative electrode by means of a chemical reaction.

For instance, JP-A-7-302617 discloses a technique of covering the surface of a lithium negative electrode with a lithium fluoride film by exposing it to an electrolyte containing hydrofluoric acid and causing the negative electrode to react with hydrofluoric acid. Hydrofluoric acid is produced as a result of reaction of $LiPF_6$ and a minute quantity of water. On the other hand, a surface film of lithium hydroxide or lithium oxide is formed on the surface of the lithium negative electrode due to natural oxidation in the air. A surface film of lithium fluoride is formed on the surface of the negative electrode as they react with each other. However, such a lithium fluoride film is produced as a result of reaction of the electrode interface and a solution and hence one or more than one side reaction products are apt to be mingled in the surface film to make it difficult to obtain a homogeneous film. Additionally, there may be occasions where the surface film of lithium hydroxide or lithium oxide is not formed homogeneously and those where lithium is partly exposed. In such occasions, no homogeneous thin film can be formed and water or hydrogen fluoride and lithium may react with each other to give rise to problems. If the reaction is insufficient, unnecessary compounds are left in addition to the fluorides to consequently reduce the ion conductivity. Furthermore, the scope of fluorides and that of electrolytes that can be utilized are limited and it is difficult to form a stable surface film at a high yield rate with such a technique of forming a fluoride layer by means of a chemical reaction on the interface.

JP-A-8-250108 describes a technique of forming a surface film of lithium fluoride on the surface of a negative electrode by causing a mixture gas of argon and hydrogen fluoride and an aluminum-lithium alloy to react with each other. However, the reaction can be easily become uneven to make it difficult to form a homogeneous lithium fluoride film when a surface film exists in advance on the surface of the lithium metal and particularly when a plurality of different compounds exists there. Therefore, it is difficult to obtain a lithium secondary battery having sufficient cycle characteristics.

JP-A-11-288706 discloses a technique of forming a surface film structure containing a substance having a halite-type crystal structure as principal ingredient on the surface of a lithium sheet of a uniform crystal structure where preferential orientation of the (100) crystal plane is observed. With such an arrangement, it is possible to secure homogeneous deposition/dissolution reactions and hence uniform charging/discharging cycles of the battery and suppress the dendrite deposition of lithium metal so as to improve the cycle life of the battery. A substance containing a lithium halide is preferably used for the surface film. According to the Patent Document, the use of a solid solution of at least a lithium halide selected from LiCl, LiBr and LiI and LiF is preferable. More specifically, a negative electrode is prepared for a non-aqueous electrolyte battery by immersing a lithium sheet having preferential orientation of the (100) crystal plane that is prepared by means of a pressure (flat rolling) process in order to produce a solid solution film of at least LiCl, LiBr or LiI and LiF in an electrolyte containing at least either chlorine molecules or chlorine ions, bromine molecules or bromine ions, or iodine molecules or iodine ions and fluorine molecules or fluorine ions. However, with the technique of JP-A-11-288706 that uses a flat rolled lithium metal sheet, the lithium sheet is apt to be exposed to the atmosphere and a film attributable to moisture is likely to be formed on the surface to make active sites exist inhomogeneously so that it is difficult to produce an intended stable surface film and a satisfactory effect of suppressing generation of dendrite cannot be achieved.

Abstracts of the 2000th fall meeting of Electrochemical Society of Japan) 2A24 (2000) and Abstracts of the 41st Battery Symposium in Japan 1E03 (2000) report the effect of a complex of an europium compound or some other lanthanoid-transition metal and imide anions on a lithium metal negative electrode. According to these papers, a surface film of $Eu[(C_2F_5SO_2)_2]_3$ complex is formed on the surface of Li metal immersed in an electrolyte prepared by dissolving $LiN(C_2F_5SO_2)_2$ as lithium salt into a mixture solvent of propylene carbonate or ethylene carbonate and 1,2-dimethoxyethane and adding $Eu(CF_3SO_3)_3$ as additive. However, this method is not satisfactory although it provides an effect of improving the cycle life to a certain extent. Additionally, the use of a lithium imide salt such as $LiN(C_2F_5SO_2)_2$ that is relatively expensive as electrolyte is indispensable and the cycle characteristics are not improved if a complex of some other lithium salt (such as popular $LiPF_6$) transition metal and $CF_3SO_3^-$ ions is added because a complex of transition metal and imide anions is not produced. Furthermore, there arises a problem of high internal resistance of battery because resistance of electrolyte increases if compared with the use of $LiPF_6$ when lithium imide salt is employed as the electrolyte.

Furthermore, a technique of using a carbon material that can occlude and discharge such as graphite or amorphous carbon for a negative electrode to improve the capacity and the charge-discharge efficiency of battery is also reported.

JP-A-5-234583 proposes a negative electrode formed by covering a carbon material with aluminum. With such an arrangement, the reductive decomposition of solvent molecules that are solvated with lithium ions on the carbon surface is suppressed to by turn suppress the degradation of the cycle life of battery. However, the capacity of a battery using such a negative electrode can fall rapidly when the operation cycle is repeated because aluminum reacts with a small quantity of water.

JP-A-5-275077 proposes a negative electrode formed by covering the surface of a carbon material with a thin film of a lithium ion conductive solid electrolyte. With such an arrangement, it is believed that the decomposition of solvent that occurs when a carbon material is employed is suppressed to make it possible to provide a lithium ion secondary battery that can use propylene carbonate. However, cracks that appear in the solid electrolyte due to the change in the stress occurring at the time of inclusion of lithium ions and also at the time of elimination of lithium ions induce degradation of the characteristics. Additionally, reactions do not take place uniformly on the surface of the negative electrode because of the inhomogeneity of the solid electrolyte due to crystal defects and other causes to consequently reduce the cycle life.

JP-A-7-122296 discloses a non-aqueous electrolyte secondary battery having a negative electrode made of a carbon material whose d value at the lattice plane (002) is not more than 3.37 Å and a non-aqueous electrolyte containing a carbonic acid ester and also a vinylene carbonate derivative. The Patent Document claims that such a non-aqueous secondary battery can suppress decomposition of the non-aqueous electrolyte on the carbon negative electrode and improve the cycle characteristics. However, secondary batteries using vinylene carbonate or a vinylene carbonate derivative still have a room for improvement particularly in terms of high temperature characteristics and cycle characteristics.

JP-A-2000-003274 discloses a secondary battery having a negative electrode made of a material containing graphite and an electrolyte containing a cyclic carbonate and a linear chain carbonate as principal ingredients along with 1,3-propanesultone and/or 1,4-butanesultone by not less than 0.1 wt % and not more than 4 wt %. It is believed that 1,3-propanesultone and/or 1,4-butanesultone contributes to forming of a passive film on the surface of the carbon material so as to coat the carbon material that is turned highly crystalline due to the activity of natural graphite or artificial graphite with the passive film and exerts an effect of suppressing decomposition of the electrolyte without damaging the normal reaction of the battery. However, this technique does not provide a satisfactory film effect and is accompanied by a problem that an electric charge attributable to decomposition of solvent molecules or anions appear as irreversible capacity component to induce a fall of the initial charge-discharge efficiency. Additionally, the resistance of the ingredients of the produced film is high and the resistance rises with time at a high rate particularly at high temperatures. JP-B-5-44946 and U.S. Pat. No. 4,950,768 disclose a method of manufacturing a cyclic sulfonic acid ester having two sulfonyl groups. Compounds having a sulfonyl group are described in JP-A-60-154478 (sulfolane), JP-A-62-100948, JP-A-63-102173, JP-A-11-339850 (1,3-propanesultone and 1,4-butanesultone), JP-A-10-189041, JP-A-2000-235866 (γ-sultone compounds) and JP-A-2000-294278 (sulfolene derivatives). Vinylene carbonate and its derivatives are described in JP-A-4-169075, JP-A-8-45545, JP-A-5-82138, JP-A-5-74486, JP-A-6-52887, JP-A-11-260401, JP-A-2000-208169, JP-A-2001-35530 and JP-A-2000-138071.

However, the prior art does not provide a satisfactory film effect for improving the battery characteristics and still has the problems as listed below.

The surface film formed on the surface of a negative electrode of a battery is closely related to the charge-discharge efficiency, the cycle life and the safety of the battery because of its properties. However, no technique has been known to date for controlling the film for an extended period of time. The effect of suppressing dendrite can be obtained to a certain extent in the initial stages of use when a surface film of lithium halide or a glassy oxide on a layer of lithium or lithium alloy. However, the surface film is degraded and gradually loses its function of protective film as the battery is operated repeatedly. It is believed that this problem arises because the layer of lithium or lithium alloy changes its volume as lithium is occluded and discharged, whereas the film of a lithium halide or the like on the layer hardly changes its volume so that internal stress arises in these layers and the interface thereof. As such internal stress arises, particularly the surface film of a lithium halide is partly damaged to lower the effect of suppressing dendrite.

As for carbon materials such as graphite, the use of such a material does not provide a satisfactory film effect and gives rise to a problem that an electric charge attributable to decomposition of solvent molecules or anions appear as irreversible capacity component to induce a fall of the initial charge-discharge efficiency. Additionally, the composition, the crystalline state and the stability of the film that is produced at this time significantly influence the subsequent efficiency and the cycle life of the battery. Furthermore, the minute amount of moisture existing in the negative electrode of graphite or amorphous carbon accelerates decomposition of the solvent of the electrolyte. Therefore, water molecules need to be eliminated when a negative electrode of graphite or amorphous carbon is employed.

In this way, the film that is formed on the surface of the negative electrode is closely related to the charge-discharge efficiency, the cycle life and the safety of the battery because of its properties. However, no technique has been known to date for controlling the film for an extended period of time. Therefore, there is a demand for newly developed electrolytes capable of forming a film that can realize a stable and satisfactory charge-discharge efficiency at the negative electrode of a battery.

SUMMARY

In view of the above-identified circumstances, it is therefore the object of the present invention to provide a non-aqueous electrolyte that can suppress decomposition of a solvent, improve the cycle life of a secondary battery, suppress the increase of resistance of a secondary battery and improve the capacity retention ratio of a secondary battery, and a non-aqueous electrolyte secondary battery using the same.

The inventors of the present invention found that the above object is achieved when an electrolyte prepared by using an aprotic solvent has a substituent where a cyclic disulfonate compound has an unsaturated bond and got to this invention.

Namely, according to the present invention, there is provided a non-aqueous electrolyte containing an aprotic solvent and a disulfonic acid ester having unsaturated bonds as expressed by chemical formula 1 shown below.

Chemical formula 1

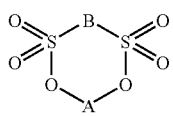

In the above chemical formula, A and B respectively and independently represent alkylene groups having 1 to 5 carbon atoms and at least either A or B has an alkenyl group as substituent.

Preferably, the non-aqueous electrolyte as defined above further contains one or more than one compounds having a sulfonyl group in addition to the compound expressed by chemical formula 1. Still preferably, the one or more than one compounds having a sulfonyl group include a compound expressed by chemical formula 2 shown below.

Chemical formula 2

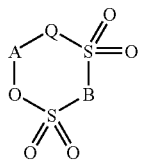

In the above chemical formula 2, Q represents an oxygen atom, a methylene group or a single bond, A represents a group selected from a substituted or unsubstituted alkylene group having 1 to 5 carbon atoms, a carbonyl group, a sulfinyl group, a polyfluoroalkylene group having 1 to 5 carbon atoms, a substituted or unsubstituted fluoroalkylene group having 1 to 5 carbon atoms, a group formed by turning at least one of the C—C bonds of a substituted or unsubstituted alkylene group having 1 to 5 carbon atoms to a C—O—C bond, a group formed by turning at least one of the C—C bonds of a polyfluoroalkylene group having 1 to 5 carbon atoms to a C—O—C bond and a group formed by turning at least one of the C—C bonds of a substituted or unsubstituted fluoroalkylene group having 1 to 5 carbon atoms to a C—O—C bond, and B represents a group selected from a substituted or unsubstituted alkylene group having 1 to 5 carbon atoms, a polyfluoroalkylene group having 1 to 5 carbon atoms and a substituted or unsubstituted fluoroalkylene group having 1 to 5 carbon atoms.

Preferably, the non-aqueous electrolyte as defined above contains a sultone compound expressed by chemical formula 3 shown below as one or more than one compounds having a sulfonyl group.

Chemical formula 3

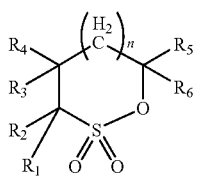

In the above chemical formula 3, n represents an integer not smaller than 0 and not greater than 2, and each of R1 through R6 represents a hydrogen atom or a group selected from an alkyl group having not less than 1 and not more than 12 carbon atoms, a cycloalkyl group having not less than 3 and not more than 6 carbon atoms and an aryl group having not less than 6 and not more than 12 carbon atoms.

Preferably, for the purpose of the present invention, the non-aqueous electrolyte as defined above contains a compound expressed by the above chemical formula 1 by not less than 0.005 mass % and not more than 10 mass % of the entire electrolyte. Preferably, the non-aqueous electrolyte as defined above contains vinylene carbonate or a derivative thereof. Preferably, in the non-aqueous electrolyte as defined above, the aprotic solvent contains one or not less than two solvents selected from a group of cyclic carbonates, linear chain carbonates, aliphatic carboxylic acid esters, γ-lactones, cyclic ethers, linear chain ethers and fluorine derivatives of any of them. Preferably, the non-aqueous electrolyte as defined above contains as lithium salt one or more than one compounds selected from a group of $LiPF_6$, $LiBF_4$, $LiAsF_6$, $LiSbF_6$, $LiClO_4$, $LiAlCl_4$ and $LiN(C_nF_{2n+1}SO_2)(C_mF_{2m+1}SO_2)$ (where n and m are natural numbers).

According to the present invention, there is also provided a non-aqueous electrolyte secondary battery, including a non-aqueous electrolyte as defined above and at least a positive electrode and a negative electrode. Preferably, in the non-aqueous electrolyte secondary battery as defined above, the positive electrode active substance of the positive electrode contains a lithium-containing complex oxide. Preferably, in the non-aqueous electrolyte secondary battery as defined above, the negative electrode active substance of the negative electrode contains one or not less than two substances selected from a group of materials that can occlude and discharge lithium, lithium metal, metal materials that can form an alloy with lithium and oxide materials. Preferably, in the non-aqueous electrolyte secondary battery as defined above, the negative electrode active substance contains a carbon material. The carbon material may be graphite or amorphous carbon.

An electrolyte to be used for a secondary battery according to the present invention contains a disulfonic acid ester expressed by the above chemical formula 1. A compound expressed by the above chemical formula 1 contributes to forming a passive film on the interface of one of the electrodes of a battery so as to consequently suppress decomposition of solvent molecules. In the case where the positive electrode of a battery is made of an oxide that contains manganese, such a compound suppresses elution of manganese and prevents eluted manganese from adhering to the negative electrode of the battery. Therefore, it is possible to improve the cycle performances of a secondary battery and suppress the rise of resistance thereof due to the effect of forming a film on the negative electrode and alleviating the adverse effect of eluted manganese by using an electrolyte according to the present invention in the secondary battery.

Thus, according to the present invention, it is possible to suppress decomposition of solvent of the electrolyte of a non-aqueous electrolyte secondary battery by using an electrolyte containing an aprotic organic solvent and a compound expressed by the chemical formula 1. Additionally, according to the present invention, it is possible to improve the charge-discharge efficiency and the cycle life of a non-aqueous electrolyte secondary battery. Still additionally, according to the present invention, it is possible to suppress the rise of resistance of a secondary battery. Furthermore, according to the present invention, it is possible to improve the capacity maintenance ratio of a secondary battery. An electrolyte to be used for a secondary battery according to the present invention can be manufactured stably in a simple manner by way of a step of dissolving a compound expressed by the above chemical formula 1 in a solvent and a step of dissolving a lithium salt in the solvent.

BRIEF DESCRIPTION OF THE DRAWINGS

The invention will be described with reference to the accompanying drawings, wherein like numbers reference like elements.

FIG. 1 is a schematic illustration of a non-aqueous electrolyte secondary battery according to the present invention, showing the configuration thereof.

In FIG. 1, 11 denotes a positive electrode collector, 12 denotes a layer containing a positive electrode active substance, 13 denotes a layer containing a negative electrode active substance, 14 denotes a negative electrode collector, 16 denotes a porous separator and 17 denotes a film casing.

DESCRIPTION OF EXEMPLARY EMBODIMENTS

Now, a non-aqueous electrolyte according to the present invention will be described particularly in terms of composition. The non-aqueous electrolyte contains an aprotic solvent and a disulfonic acid ester expressed by chemical formula 1 shown below.

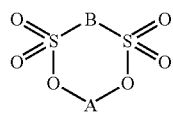

Chemical formula 1

In the above chemical formula, A and B respectively and independently represent alkylene groups having 1 to 5 carbon atoms and at least either A or B has an alkenyl group as substituent.

Examples of substituents of an alkylene group that A and B can represent typically include vinyl groups, allyl groups, isopropenyl groups, 1-propenyl groups, 1-butenyl groups, 2-butenyl groups, 3-butenyl groups, 1,3-butadienyl groups, 1-pentenyl groups, 2-pentenyl groups, 3-pentenyl groups and 4-pentenyl groups. Examples of other substituents include halogen atoms, carbonyl groups, sulfinyl groups, sulfonyl groups and ethers.

While the effect provided for a secondary battery according to the present invention by that a disulfonic acid ester compound contains an alkenyl group is not clear, the alkenyl group part may be subjected to a polymerization reaction as a result of the electrochemical reaction that takes place at the time of charging and also at the time of discharging the battery to form a more stable film on the surface of the negative electrode to by turn suppress any decomposition reaction of the electrolyte and the supporting salt and also degradation of the battery characteristics particularly in terms of cycle characteristics and storage characteristics.

Now, typical examples of compounds expressed by the above chemical formula 1 will be listed below, although the present invention is by no means limited thereto. Each of the numbers listed in Table 1 indicates each of the compound numbers described in the present specification. Hereinafter, in the present specification, the compounds designated with the respective compound numbers 1 through 39 mean the compounds listed in Table 1.

1 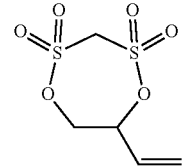

2 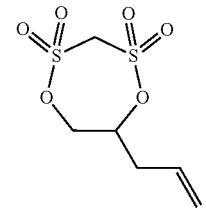

3 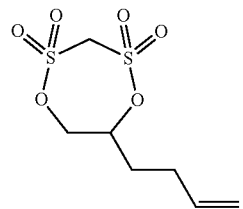

4 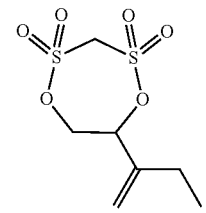

5 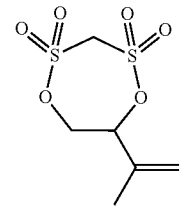

6 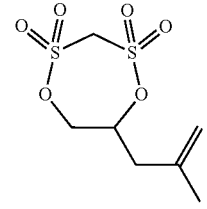

7 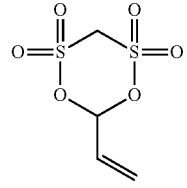

| | |
|---|---|
| 8 | 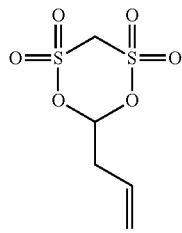 |
| 9 | 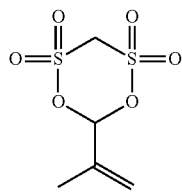 |
| 10 | 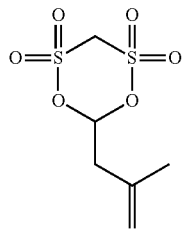 |
| 11 | 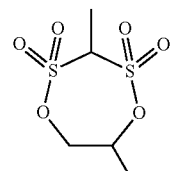 |
| 12 | 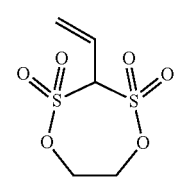 |
| 13 | 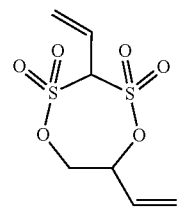 |
| 14 | 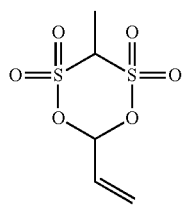 |
| 15 | 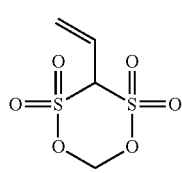 |

| | |
|---|---|
| 16 | 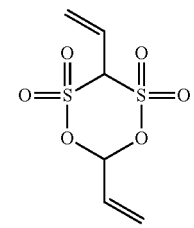 |

For instance, a compound expressed by the above chemical formula 1 can be obtained by means of a manufacturing method disclosed in JP-B-05-044946 and U.S. Pat. No. 4,950,768.

While there are no particular limitations to the ratio by which a compound expressed by the chemical formula 1 is contained in a non-aqueous electrolyte according to the present invention, preferably, it is contained by 0.005 to 10 mass % relative to the entire non-aqueous electrolyte. A satisfactory film effect can be achieved by making the concentration of the compound expressed by the chemical formula 1 not less than 0.005 wt %. More preferably, the compound expressed by the chemical formula 1 is added to make the concentration not less than 0.01 wt % so as to further improve the battery characteristics. The rise of viscosity and the resultant increase of resistance of the non-aqueous electrolyte can be suppressed when the concentration is made not more than 10 wt %. More preferably, the compound expressed by the chemical formula 1 is added to make the concentration not more than 5 wt % so as to further improve the battery characteristics.

The non-aqueous electrolyte may contain one or more than one compound having a sulfonyl group in addition to the compound expressed by the above chemical formula 1. For instance, it may contain a compound expressed by chemical formula 2 shown below.

Chemical formula 2

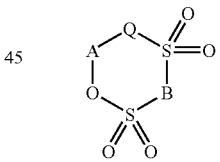

In the above chemical formula 2, Q represents an oxygen atom, a methylene group or a single bond, A represents a group selected from a substituted or unsubstituted alkylene group having 1 to 5 carbon atoms, a carbonyl group, a sulfinyl group, a polyfluoroalkylene group having 1 to 5 carbon atoms, a substituted or unsubstituted fluoroalkylene group having 1 to 5 carbon atoms, a group formed by turning at least one of the C—C bonds of a substituted or unsubstituted alkylene group having 1 to 5 carbon atoms to a C—O—C bond, a group formed by turning at least one of the C—C bonds of a polyfluoroalkylene group having 1 to 5 carbon atoms to a C—O—C bond and a group formed by turning at least one of the C—C bonds of a substituted or unsubstituted fluoroalkylene group having 1 to 5 carbon atoms to a C—O—C bond, and B represents a group selected from a substituted or unsubstituted alkylene group having 1 to 5 carbon atoms, a polyfluoroalkylene group having 1 to 5 carbon atoms and a substituted or unsubstituted fluoroalkylene group having 1 to 5 carbon atoms.

Thus, the non-aqueous electrolyte may contain a compound expressed by the above chemical formula 2. A compound expressed by the above chemical formula 2 further suppresses decomposition of solvent molecules. In the case where the positive electrode is made of an oxide that contains manganese, such a compound reliably further alleviate the influence of elution of manganese. Therefore, it is possible to improve the cycle characteristics of a secondary battery. Additionally, it is possible to suppress the rise of resistance of a secondary battery.

Note that, in the above chemical formula 2, the number of carbon atoms of A refers to the number of carbon atoms that constitute the ring without the number of carbon atoms included in the side linear chains. When A is a substituted or unsubstituted fluoroalkylene group having 2 to 5 carbon atoms, A may have a methylene unit and a fluoromethylene unit or it may have only a fluoromethylene unit. Additionally, when an alkylene unit or a fluoroalkylene unit is bonded by way of an ether bond, alkylene units or fluoroalkylene units, whichever appropriate, may be bonded to each other or, alternatively, an alkylene unit and a fluoroalkylene unit may be bonded to each other.

The non-aqueous electrolyte according to the present invention may contain a sultone compound expressed by chemical formula 3 shown below as a compound having a sulfonyl group.

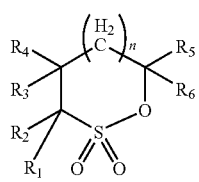

Chemical formula 3

In the above chemical formula 3, n represents an integer not smaller than 0 and not greater than 2, each of R1 through R6 represents a hydrogen atom or a group selected from an alkyl group having not less than 1 and not more than 12 carbon atoms, a cycloalkyl group having not less than 3 and not more than 6 carbon atoms and an aryl group having not less than 6 and not more than 12 carbon atoms.

The viscosity of the non-aqueous electrolyte can be adjusted with ease when a compound having a sulfonyl group expressed by the chemical formula 2 or the chemical formula 3 is added in addition to a compound expressed by the chemical formula 1. The stability of the film is improved by a synergetic effect of using compounds having a sulfonyl group in combination. Additionally, it is possible to suppress decomposition of solvent molecules. Furthermore, the effect of removing moisture from the non-aqueous electrolyte is boosted.

Examples of compounds having a sulfonyl group include sulfolane (see JP-A-60-154478), 1,3-propanesultone and 1,4-butanesultone (see JP-A-2000-003724, JP-A-62-100948, JP-A-63-102173 and JP-A-11-339850), alkane sulfonic acid anhydride (see JP-A-10-189041), γ-sultone compounds (see JP-A-2000-235866) and sulfolene derivatives (see JP-A-2000-294278), although the present invention is by no means limited thereto.

If a sulfonyl compound is added to a non-aqueous electrolyte in addition to a compound expressed by the above chemical formula 1, it may be added to such an extent that the concentration thereof is not less than 0.005 wt % and not more than 10 wt % in the non-aqueous electrolyte. A film can be effectively formed on the surface of the negative electrode of a secondary battery by adding a sulfonyl compound to a concentration of not less than 0.005 wt %, preferably not less than 0.01 wt %. The solubility of sulfonyl compound is maintained and the rise of viscosity of the non-aqueous electrolyte can be suppressed when the sulfonyl compound concentration is not more than 10 wt %, preferably not more than 5 wt %.

The non-aqueous electrolyte according to the present invention is obtained by dispersing a compound expressed by the chemical formula 1 and, if necessary, a compound having a sulfonyl group into an aprotic solvent along with a lithium salt and other additive or additives. The battery characteristics of a secondary battery formed by using such a non-aqueous electrolyte can be effectively improved by using a mixture of additives having different properties because films having different properties are formed on the surface of the negative electrode.

The cycle characteristics and the effect of suppressing the rise of resistance of such a secondary battery can be improved by adding vinylene carbonate (VC) or a derivative thereof to the non-aqueous electrolyte. The compounds described, for instance, in JP-A-7-122296, JP-A-4-169075, JP-A-8-45545, JP-A-5-82138, JP-A-6-52887, JP-A-11-260401, JP-A-2000-208169, JP-A-2001-35530 and JP-A-2000-138071 may provide appropriate candidates that can be used as vinylene carbonate or a derivative thereof.

The content ratio of vinylene carbonate or a derivative thereof that is added to the non-aqueous electrolyte is preferably not less than 0.01 wt % and not more than 10 wt %. The non-aqueous electrolyte can be made to appropriately exert its cycle characteristics and suppress the rise of resistance in high temperature storage when the content ratio is not less than 0.01 wt %. The resistance of the non-aqueous electrolyte can be reduced when the content ratio is not more than 10 wt %.

The non-aqueous electrolyte according to the present invention may be made to contain a lithium salt as electrolyte. This arrangement can improve the battery characteristics because lithium ions operate as moving substance. One or more than one substances selected from lithium imide salt, $LiPF_6$, $LiBF_4$, $LiAsF_6$, $LiSbF_6$, $LiClO_4$, $LiAlCl_4$ and $LiN(C_nF_{2n+1}SO_2)(C_mF_{2m+1}SO_2)$ (where n and m are natural numbers) may be used as lithium salt for the purpose of the present invention. Of the above listed substances, the use of $LiPF_6$, or $LiBF_4$ is particularly preferable. The electric conductivity of lithium salt can be raised to by turn further improve the cycle characteristics of secondary battery when such a substance is employed.

The non-aqueous electrolyte according to the present invention may contain one or not less than two solvents selected from a group of cyclic carbonates, linear chain carbonates, aliphatic carboxylic acid esters, γ-lactones, cyclic ethers, linear chain ethers and fluorine derivatives of any of them.

Specific examples of such compounds include cyclic carbonates such as propylene carbonate (PC), ethylene carbonate (EC), butylene carbonate (BC) and vinylene carbonate (VC), linear chain carbonates such as dimethyl carbonate (DMC), diethyl carbonate (DEC), ethyl methyl carbonate (EMC) and dipropyl carbonate (DPC), aliphatic carboxylic acid esters such as methyl formate, methyl acetate and ethyl propionate, γ-lactones such as γ-butyrolactone, linear chain ethers such as 1,2-ethoxyethane (DEE) and ethoxymethoxyethane (EME), cyclic ethers such as tetrahydrofuran and 2-methyltetrahydrofuran, dimethyl sulfoxide, 1,3-dioxolane, formamide, acetamide, dimethylformamide, acetonitrile, propylnitrile, nitromethane, ethyl monoglyme, phosphate triester, trimethoxymethane, dioxolane derivatives, sulfolane, methyl sulfolane, 1,3-dimethyl-2-imidazolidinone, 3-methyl-2-oxazolidinone, propylene carbonate derivatives, tetrahydrofuran derivatives, ethyl ether, N-methylpyrolidone, fluorinated carboxylic acid ester, methyl-2,2,2-trifluoroethyl carbonate, methyl-2,2,3,3,3-pentafluoropropyl carbonate, trifluoromethylethylene carbonate, monofluoromethylethylene carbonate, difluoromethylethylene carbonate, 4,5-difluoro-1,3-dioxolane-2-on, monofluoroethylene carbonate, one or not less than two of which may be used as mixture.

Now, the configuration of a non-aqueous electrolyte secondary battery according to the present invention will be described below by referring to the accompanying drawing. FIG. 1 is a schematic cross sectional view of a non-aqueous electrolyte secondary battery according to the present invention, showing the configuration thereof.

In a non-aqueous electrolyte secondary battery 1 according to the present invention, the positive electrode is formed by forming a layer 12 that contains a positive electrode active substance on a positive electrode collector 11 and the negative electrode is formed by forming a layer 13 that contains a negative electrode active substance on a negative electrode collector 14. The positive electrode and the negative electrode are arranged opposite to each other by way of a porous separator 16. The porous separator 16 is arranged substantially in parallel with the layer 13 containing the negative electric active substance. The layer 12 containing the positive electrode active substance, the layer 13 containing the negative electrode active substance and the porous separator 16 are impregnated with a non-aqueous electrolyte (not shown) and sealed in a film casing 17.

In the non-aqueous electrolyte secondary battery shown in FIG. 1, one or not less than two substances selected from a group of substances including lithium metal, lithium alloys and materials that can occlude and discharge lithium may be used as the negative electrode active substance that is employed for the layer 13 containing the negative electrode active substance. A carbon material or an oxide may be used as a material that occludes and discharges lithium ions.

Carbon materials that can be used for the purpose of the present invention include graphite, amorphous carbon, diamond-like carbon, carbon nanotubes and complex oxides of any of them that occlude lithium. Of these, the use of a graphite or an amorphous carbon is particularly preferable. More particularly, the use of a graphite is highly preferable because it shows a high electron conductivity and is excellent in terms of adhesion to a collector that is made of copper or some other metal and flat voltage profile while it hardly contains impurities because it is produced at a high treatment temperature and is advantageous for achieving an improved negative electrode performance.

Oxides that can be used for the purpose of the present invention include silicon oxide, tin oxide, indium oxide, zinc oxide, lithium oxide, phosphoric acid, boric acid and mixtures of any of them. Particularly, the oxide material to be used as negative electrode active substance preferably includes silicon oxide. Silicon oxide preferably is structurally in an amorphous state. This is because silicon oxide is stable and does not give rise to any reaction with other compounds and the amorphous structure does not induce degradation attributable to inhomogeneity such as grain boundaries and/or defects. A vapor deposition process, a CVD process or a sputtering process may be used for forming a film layer containing a negative electrode active substance.

Lithium alloys are formed by lithium and one or more than one metals that can form an alloy with lithium. A lithium alloy that can be used for the purpose of the present invention is typically selected from binary, ternary or higher alloys of one or more than one metals selected from Al, Si, Sn, In, Bi, Ag, Ba, Ca, Pd, Pt, Te, Zn, La and so on. Lithium metal or a lithium alloy to be used for the purpose of the present invention is preferably amorphous. This is because an amorphous structure does not induce degradation attributable to inhomogeneity such as grain boundaries and/or defects.

Lithium metal or a lithium alloy can be formed by way of a melt cooling process, a liquid quenching process, an atomization process, a vacuum deposition process, a sputtering process, a plasma CVD process, a photo-CVD process, a thermal CVD process, a sol-gel process or some other appropriate process.

Preferably, a complex of transition metal cations and imide anions is made to exist along the interface of the negative electrode and the non-aqueous electrolyte of a secondary battery of FIG. 1 because the negative electrode becomes outstanding in terms of flexibility relative to volume changes of the metal phase or the alloy phase, uniformity of ion distribution and physical and chemical stability. Then, as a result, generation of dendrite and pulverization of lithium can be effectively prevented from taking place to consequently improve the cycle efficiency and the cycle life.

Dangling bonds that may exist on the surface of the negative electrode when a carbon material or an oxide material is employed for the negative electrode are chemically highly active and can easily decompose the solvent. However, as a complex of transition metal cations and imide anions is adsorbed to the surface, the decomposition of the solvent is suppressed to remarkably reduce the irreversible capacity and maintain a high charge-discharge efficiency.

When the film is mechanically damaged, the lithium on the surface of the negative electrode and the lithium fluoride, which is a reaction product of imide anions that are adsorbed to the surface of the negative electrode, operate to restore the film at the damaged areas so that they provide an effect of producing a stable surface compound even after the film is damaged.

Examples of positive electrode active substances that can be used for the layer 12 that contains a positive electrode active substance in the secondary battery of FIG. 1 include lithium-containing complex oxides such as $LiCoO_2$, $LiNiO_2$ and $LiMn_2O_4$. The transition metal part of any of such a lithium-containing complex oxides may be substituted by some other element.

A lithium-containing complex oxide having a plateau at or above 4.5V in terms of metal lithium counter electrode potential may also be used for the purpose of the present invention. Examples of lithium-containing complex oxides include spinel type lithium manganese complex oxides, olivine type lithium-containing complex oxides and inverse-spinel type lithium-containing complex oxides. Compounds expressed by chemical formula 5 shown below can be employed as lithium-containing complex oxides for the purpose of the present invention.

$$Li_a(M_xMn_{2-x})O_4 \qquad \text{chemical formula 5}$$

In the above chemical formula 5, $0<x<2$ and $0<a<1.2$. M is at least an element selected from a group of Ni, Co, Fe, Cr and Cu.

The positive electrode can be obtained by dispersing and kneading such an active substance in a solvent such as N-methyl-2-pyrolidone (NMP) along with a conductive substance such as carbon black and a binder such as polyvinylidene fluoride (PVDF) and applying the mixture to a base member such as aluminum foil.

The secondary battery shown in FIG. 1 is prepared by laying a negative electrode and a positive electrode one on the other with a porous separator 16 interposed between them to produce a multilayer structure in dry air or an inert gas atmosphere, folding the multilayer structure, containing the folded multilayer structure into a battery can or a film casing which is typically made of a flexible laminate film of synthetic resin and metal foil and impregnating the multilayer structure with a non-aqueous electrolyte containing a compound expressed by the above chemical formula 1. A film can be formed on the negative electrode by sealing the film casing and charging the secondary battery before or after the sealing. A porous film typically made of polypropylene, polyolefin such as polyethylene or fluoro resin is employed for the porous separator 16.

While the profile of the secondary battery of this embodiment is not subjected to any particular limitations, possible profiles include a cylindrical profile, a box-shaped profile, a film casing profile or a coin-like profile.

EXAMPLE 1

Preparation of Battery

Now, the preparation of the battery of this example will be described below. A 20 micrometer-thick aluminum foil was used as positive electrode collector and $LiMn_2O_4$ was employed as positive electrode active substance. On the other hand, a 10 micrometer-thick copper foil was used as negative electrode collector and the negative electrode was prepared by depositing lithium metal as negative electrode active substance to a thickness of 20 micrometer on the copper foil by evaporation. A mixture solvent of EC and DEC (volume ratio: 30/70) was employed as solvent of electrolyte and $LiN(C_2F_5SO_2)_2$, which is a fluorine-containing organic lithium salt, was dissolved in the mixture solvent as supporting electrolyte by 1 mol/L. Additionally, compound 1 listed in Table 1 shown above was added to the electrolyte so as to be contained by 1 wt %. Then, the negative electrode and the positive electrode were laid one on the other with a polyethylene separator interposed between them. The non-aqueous electrolyte secondary battery of this example was prepared in the above-described way.

Charge-Discharge Cycle Test

A charge rate of 0.05 C, a discharge rate of 0.1 C, an end of charge voltage of 4.2V, an end of discharge voltage of 3.0V and a utilization ratio (discharge depth) of the lithium metal negative electrode of 33% were used at a temperature of 20 degrees C. The capacity maintenance ratio (%) is the value obtained by dividing the discharge capacity (mAh) after 400 cycles by the discharge capacity (mAh) at the 10th cycle. Table 2 below shows the results obtained from the cycle test.

EXAMPLES 2, 3 AND 4

Non-aqueous electrolyte secondary batteries were prepared in these examples as in Example 1 except that the compound number 1 was replaced by the respective compounds listed in Table 2 that is, by the compounds of the compound numbers 5, 7, 14 listed in Table 1 and the battery characteristics of these batteries were tested as in Example 1. Table 2 shows the results.

COMPARATIVE EXAMPLE 1

A secondary battery was prepared in this comparative example as in Example 1 except that the compound number 1 was not added and the battery characteristics of this battery were tested as in Example 1. Table 2 shows the results.

COMPARATIVE EXAMPLE 2

A secondary battery was prepared in this comparative example as in Example 1 except that the compound number 1 was replaced by 1,3-propanesultone and the battery characteristics of this battery were tested as in Example 1. Table 2 shows the results.

TABLE 2

| | Negative-electrode active material | Solvent | Additive expressed by chemical formula 1 | Additive other than listed left | Capacity retention ratio (%) |
|---|---|---|---|---|---|
| Example 1 | metal lithium | EC/DEC | compound No. 1 | None | 82.3 |
| Example 2 | metal lithium | EC/DEC | compound No. 5 | None | 82.9 |
| Example 3 | metal lithium | EC/DEC | compound No. 7 | None | 82.5 |
| Example 4 | metal lithium | EC/DEC | compound No. 14 | None | 82.4 |
| Comp. Ex. 1 | metal lithium | EC/DEC | None | None | 45.6 |
| Comp. Ex. 2 | metal lithium | EC/DEC | None | 1,3-propanesultone | 57.5 |

From Table 2, it was confirmed that the capacity maintenance ratios after a cycle test of and hence the cycle characteristics of the batteries of Examples 1, 2, 3 and 4 showed an improvement from Comparative Examples 1 and 2.

EXAMPLE 5

A secondary battery was prepared in this example as in Example 1 except that $LiN(C_2F_5SO_2)_2$ was replaced by $LiPF_6$ as supporting electrolyte and the negative electrode was formed by mixing graphite powder, polyvinylidene fluoride dissolved in N-methyl-2-pyrolidone so as to operate as binder and a conductivity providing material into paste, applying the mixture paste to a copper foil and drying it.

The charge-discharge cycle test of this example was conducted at temperature of 20 degrees C. with a charge rate of 1 C, a discharge rate of 1 C, an end of charge voltage of 4.2V and an end of discharge voltage of 3.0V. The capacity maintenance ratio (%) is the value obtained by dividing the discharge capacity (mAh) after 400 cycles by the discharge capacity (mAh) at the 10th cycle. Table 3 below shows the results obtained from the cycle test.

EXAMPLES 6, 7 AND 8

Secondary batteries were prepared in these examples as in Example 5 except that the compound of the compound number 1 was replaced by the respective compounds listed in Table 3, that is, by the compounds of the compound numbers 5, 7, 14 listed in Table 1, and the battery characteristics of these batteries were tested as in Example 5. Table 3 shows the results.

COMPARATIVE EXAMPLE 3

A secondary battery was prepared in this comparative example as in Example 5 except that the compound 1 was not added and the battery characteristics of this battery were tested as in Example 5. Table 3 shows the results.

TABLE 3

| | Negative-electrode active material | Solvent | Additive expressed by chemical formula 1 | Capacity retention ratio(%) |
|---|---|---|---|---|
| Example 5 | graphite | EC/DEC | compound No. 1 | 89.3 |
| Example 6 | graphite | EC/DEC | compound No. 5 | 88.9 |
| Example 7 | graphite | EC/DEC | compound No. 7 | 88.6 |
| Example 8 | graphite | EC/DEC | compound No. 14 | 88.2 |
| Comp. Ex. 3 | graphite | EC/DEC | None | 78.5 |

From Table 3, it was confirmed that the capacity maintenance ratios after a cycle test of and hence the cycle characteristics of the batteries of Examples 5 through 8 showed an improvement from Comparative Example 3.

EXAMPLE 9

A secondary battery was prepared in this example as in Example 5 except that graphite was replaced by amorphous carbon and PC/EC/DEC (volume ratio: 20/20/60) was used as main solvent of electrolyte. The battery characteristics were observed as in Example 5. Table 4 shows the results.

EXAMPLES 10, 11 AND 12

Secondary batteries were prepared in these examples as in Example 9 except that the compound number 1 was replaced by the respective compounds listed in Table 4 that is, by the compounds of the compound numbers 5, 7, 14 listed in Table 1, and the battery characteristics of these batteries were tested as in Example 9. Table 4 shows the results.

COMPARATIVE EXAMPLE 4

A secondary battery was prepared in this comparative example as in Example 9 except that the compound number 1 was not added and the battery characteristics of this battery were tested as in Example 9. Table 4 shows the results.

TABLE 4

| | Negative-electrode active material | Solvent | Additive expressed by chemical formula 1 | Capacity retention ratio (%) |
|---|---|---|---|---|
| Example 9 | amorphous carbon | PC/EC/DEC | compound No. 1 | 88.3 |
| Example 10 | amorphous carbon | PC/EC/DEC | compound No. 5 | 86.9 |
| Example 11 | amorphous carbon | PC/EC/DEC | compound No. 7 | 87.6 |
| Example 12 | amorphous carbon | PC/EC/DEC | compound No. 14 | 87.0 |
| Comp. Ex. 4 | amorphous carbon | PC/EC/DEC | None | 76.3 |

From Table 4, it was confirmed that the capacity maintenance ratios after a cycle test of and hence the cycle characteristics of the batteries of Examples 9 through 12 showed an improvement from Comparative Example 4.

EXAMPLE 13

A secondary battery was prepared in this example as in Example 1 except that 1,3-propanesultone was added to the electrolyte so as to be contained in the electrolyte by 1 mass % and the battery characteristics of this battery were tested as in Example 1. Table 5 shows the results.

EXAMPLES 14, 15 AND 16

Secondary batteries were prepared in these examples as in Example 13 except that the compound number 1 was replaced by the respective compounds listed in Table 5 and the battery characteristics of these batteries were tested as in Example 13. Table 5 shows the results.

TABLE 5

| | Negative-electrode-active material | Solvent | Additive expressed by chemical formula 1 | Additive other than listed left | Capacity retention ratio (%) |
|---|---|---|---|---|---|
| Example 13 | Li metal | EC/DEC | compound No. 1 | 1,3-propanesultone | 89.3 |
| Example 14 | Li metal | EC/DEC | compound No. 5 | 1,3-propanesultone | 88.9 |
| Example 15 | Li metal | EC/DEC | compound No. 7 | 1,3-propanesultone | 88.6 |
| Example 16 | Li metal | EC/DEC | compound No. 14 | 1,3-propanesultone | 87.7 |
| Comp. Ex. 1 | Li metal | EC/DEC | None | None | 45.6 |

From Table 5, it was confirmed that the capacity maintenance ratios after a cycle test of and hence the cycle characteristics of the batteries of Examples 13, 14, 15 and 16 showed an improvement from Examples 1, 2, 3 and 4 and Comparative Example 1. This is due to the composite effect of the compound expressed by the chemical formula 1 and 1,3-propanesultone that were used as additives.

EXAMPLE 17

A secondary battery was prepared in this example as in Example 5 except that 1,3-propanesultone was added to the electrolyte so as to be contained in the electrolyte by 1 mass % and the battery characteristics of this battery were tested as in Example 5. Table 6 shows the results.

EXAMPLES 18 THROUGH 20

Secondary batteries were prepared in these examples as in Example 17 except that the compound number 1 was replaced by the respective compounds listed in Table 6 that is, by the compounds of the compound numbers 5, 7, 14 listed in Table 1, and the battery characteristics of these batteries were tested as in Example 17. Table 6 shows the results.

TABLE 6

|  | Negative-electrode active material | Solvent | Additive expressed by chemical formula 1 | Additive other than listed left | Capacity retention ratio (%) |
|---|---|---|---|---|---|
| Example 17 | graphite | EC/DEC | compound No. 1 | 1,3-propanesultone | 90.1 |
| Example 18 | graphite | EC/DEC | compound No. 5 | 1,3-propanesultone | 90.0 |
| Example 19 | graphite | EC/DEC | compound No. 7 | 1,3-propanesultone | 89.8 |
| Example 20 | graphite | EC/DEC | compound No. 14 | 1,3-propanesultone | 89.5 |
| Comp. Ex. 3 | graphite | EC/DEC | None | None | 78.5 |

From Table 6, it was confirmed that the capacity maintenance ratios after a cycle test of and hence the cycle characteristics of the batteries of Examples 17, 18, 19 and 20 showed an improvement from Examples 5, 6, 7 and 8 and Comparative Example 3. This is due to the composite effect of the compound expressed by the chemical formula 1 and 1,3-propanesultone that were used as additives.

EXAMPLE 21

A secondary battery was prepared in this example as in Example 9 except that 1,3-propanesultone was added to the electrolyte so as to be contained in the electrolyte by 1 mass % and the battery characteristics of this battery were tested as in Example 9. Table 7 shows the results.

EXAMPLES 22, 23 AND 24

Secondary batteries were prepared in these examples as in Example 21 except that the compound number 1 was replaced by the respective compounds listed in Table 7 that is, by the compounds of the compound numbers 5, 7, 14 listed in Table 1, and the battery characteristics of these batteries were tested as in Example 21. Table 7 shows the results.

TABLE 7

|  | Negative-electrode active material | Solvent | Additive expressed by chemical formula 1 | Additive other than listed left | Capacity retention ratio (%) |
|---|---|---|---|---|---|
| Example 21 | amorphous carbon | PC/EC/DEC | compound No. 1 | 1,3-propanesultone | 90.0 |
| Example 22 | amorphous carbon | PC/EC/DEC | compound No. 5 | 1,3-propanesultone | 89.9 |
| Example 23 | amorphous carbon | PC/EC/DEC | compound No. 7 | 1,3-propanesultone | 90.0 |
| Example 24 | amorphous carbon | PC/EC/DEC | compound No. 14 | 1,3-propanesultone | 88.9 |
| Comp. Ex. 4 | amorphous carbon | PC/EC/DEC | None | None | 76.3 |

From Table 7, it was confirmed that the capacity maintenance ratios after a cycle test of and hence the cycle characteristics of the batteries of Examples 21, 22, 23 and 24 showed an improvement from Examples 9, 10, 11 and 12 and Comparative Example 4. This is due to the composite effect of the compound expressed by the chemical formula 1 and 1,3-propanesultone that were used as additives.

EXAMPLE 25

A secondary battery was prepared in this example as in Example 9 except that vinylene carbonate was added to the electrolyte so as to be contained in the electrolyte by 1 mass % and the battery characteristics of this battery were tested as in Example 9. Table 8 shows the results.

EXAMPLES 26, 27 AND 28

Secondary batteries were prepared in these examples as in Example 25 except that the compound 1 was replaced by the respective compounds listed in Table 10 that is, by the compounds of the compound numbers 5, 7, 14 listed in Table 1, and the battery characteristics of these batteries were tested as in Example 25. Table 8 shows the results.

TABLE 8

|  | Negative-electrode active material | Solvent | Additive expressed by chemical formula 1 | Additive other than listed left | Capacity retention ratio (%) |
| --- | --- | --- | --- | --- | --- |
| Example 25 | amorphous carbon | PC/EC/DEC | compound No. 1 | vinylene carbonate | 89.4 |
| Example 26 | amorphous carbon | PC/EC/DEC | compound No. 5 | vinylene carbonate | 88.7 |
| Example 27 | amorphous carbon | PC/EC/DEC | compound No. 7 | vinylene carbonate | 89.1 |
| Example 28 | amorphous carbon | PC/EC/DEC | compound No. 14 | vinylene carbonate | 88.0 |
| Comp. Ex. 4 | amorphous carbon | PC/EC/DEC | None | None | 76.3 |

From Table 8, it was confirmed that the capacity maintenance ratios after a cycle test of and hence the cycle characteristics of the batteries of Examples 25, 26, 27 and 28 showed an improvement from Examples 9, 10, 11 and 12 and Comparative Example 4.

EXAMPLE 29

A secondary battery was prepared in this example as in Example 9 except that vinylene carbonate and 1,3-propanesultone were added to the electrolyte so that each of them was contained in the electrolyte by 1 mass % and the battery characteristics of this battery were tested as in Example 9. Table 9 shows the results.

EXAMPLES 30, 31 AND 32

Secondary batteries were prepared in these examples as in Example 29 except that the compound number 1 was replaced by the respective compounds listed in Table 9 that is, by the compounds of the compound numbers 5, 7, 14 listed in Table 1, and the battery characteristics of these batteries were tested as in Example 29. Table 9 shows the results.

TABLE 9

|  | Negative-electrode active material | Solvent | Additive expressed by chemical formula 1 | Additive other than listed left | Capacity retention ratio (%) |
| --- | --- | --- | --- | --- | --- |
| Example 29 | amorphous carbon | PC/EC/DEC | compound No. 1 | vinylene carbonate + 1,3-propanesultone | 90.5 |
| Example 30 | amorphous carbon | PC/EC/DEC | compound No. 5 | vinylene carbonate + 1,3-propanesultone | 88.9 |
| Example 31 | amorphous carbon | PC/EC/DEC | compound No. 7 | vinylene carbonate + 1,3-propanesultone | 87.9 |
| Example 32 | amorphous carbon | PC/EC/DEC | compound No. 14 | vinylene carbonate + 1,3-propanesultone | 88.0 |
| Comp. Ex. 4 | amorphous carbon | PC/EC/DEC | None | None | 76.3 |

From Table 9, it was confirmed that the capacity maintenance ratios after a cycle test of and hence the cycle characteristics of the batteries of Examples 29, 30, 3 and 32 showed an improvement from Examples 9, 10, 11, 12, 25, 26, 27 and 28 and Comparative Example 4. This is due to the composite effect of the compound expressed by the chemical formula 1, 1,3-propanesultone and vinylene carbonate.

EXAMPLE 33

A secondary battery was prepared in this example as in Example 9 by using compound 1 as additive to the electrolyte. In this example, the secondary battery was held on the shelf and the resistance of the secondary battery was observed. Firstly, the prepared secondary battery was subjected to a single charge operation and a single discharge operation at 20 degrees C. Both the charge current and the discharge current that were observed at this time were constant and the discharge capacity and the resistance that were observed were defined respectively as initial capacity and initial resistance. Subsequently, the secondary battery was discharged at a constant current and a constant voltage to a predetermined voltage level in 2.5 hours and then held on the shelf again for 90 days at 45 degrees C. or 60 degrees C. Thereafter, the secondary battery was subjected to a discharge operation at room temperature with a constant current and subsequently a single charge and discharge cycle was repeated also with a constant current. Then, the resistance in the charge operation was observed. Table 10 below shows the relative resistance value after 90 days on the shelf (held on the shelf at 45 degrees C. or 60 degrees C., resistance value after 90 days/initial resistance value), determined by using 1 for the initial resistance, and the capacity maintenance ratio after 90 days on the shelf at 60 degrees C. (discharge capacity after 90 days/initial discharge capacity).

EXAMPLES 34, 35 AND 36

Secondary batteries were prepared in these examples as in Example 9 by using compounds listed in Table 10 as additive contained in the electrolyte and evaluated as in Example 33.

COMPARATIVE EXAMPLE 5

A secondary battery was prepared in this comparative example as in Example 41 except that 1,3-propanesultone was used as additive contained in the electrolyte, and evaluated in a similar manner. Table 10 shows the results.

As seen from Table 10, it was found that all the batteries of Examples 33 through 36 suppressed the rise of resistance at the cited temperatures if compared with the conventional battery of Comparative Example 5 in which 1,3-propanesultone was added to the electrolyte. The effect of suppressing the rise of resistance at 60 degrees C. was particularly remarkable. Additionally, the capacity maintenance ratio of each of the batteries of these examples showed a remarkable improvement relative to that of the battery of Comparative Example 5.

EXAMPLE 37

A secondary battery was prepared as in Example 25, using compound 1 as additive to the electrolyte of this example and evaluated as in Example 25. Table 11 below shows the relative resistance value after 90 days on the shelf (held on the shelf at 45 degrees C. or 60 degrees C., resistance value after 90 days/initial resistance value), determined by using 1 for the initial resistance, and the capacity maintenance ratio after 90 days on the shelf at 60 degrees C. (discharge capacity after 90 days/initial discharge capacity).

EXAMPLES 38, 39 AND 40

Secondary batteries were prepared in these examples as in Example 25 by using compounds listed in Table 11 as additive and evaluated in a similar manner.

COMPARATIVE EXAMPLE 6

A secondary battery was prepared in this comparative example as in Example 37 except that 1,3-propanesultone was used as additive contained in the electrolyte and evaluated in a similar manner. Table 11 shows the results.

TABLE 10

| | Additive expressed by chemical formula 1 | Additive other than listed left | Ratio of increase of resistance after 90 days (held at 45°) | Ratio of increase of resistance after 90 days (held at 60°) | Capacity retention ratio after 90 days (held at 60°) |
|---|---|---|---|---|---|
| Example 33 | compound No. 1 | None | 1.08 | 1.28 | 0.80 |
| Example 34 | compound No. 5 | None | 1.1 | 1.26 | 0.80 |
| Example 35 | compound No. 7 | None | 1.14 | 1.33 | 0.82 |
| Example 36 | compound No. 14 | None | 1.12 | 1.32 | 0.81 |
| Comp. Ex. 5 | None | 1,3-propanesultone | 1.45 | 1.61 | 0.75 |

TABLE 11

|  | Additive expressed by chemical formula 1 | Additive other than listed left | Ratio of increase of resistance after 90 days (held at 45°) | Ratio of increase of resistance after 90 days (held at 60°) | Capacity retention ratio after 90 days (held at 60°) |
|---|---|---|---|---|---|
| Example 37 | compound No. 1 | None | 1.05 | 1.23 | 0.82 |
| Example 38 | compound No. 5 | None | 1.07 | 1.24 | 0.83 |
| Example 39 | compound No. 7 | None | 1.06 | 1.22 | 0.81 |
| Example 40 | compound No. 14 | None | 10.5 | 1.23 | 0.83 |
| Comp. Ex. 6 | None | 1,3-propanesultone | 1.21 | 1.55 | 0.76 |

As seen from Table 11, it was found that all the batteries of Examples 37, 38, 39 and 40 suppressed the rise of resistance at the cited temperatures if compared with the conventional battery of Comparative Example 6 in which 1,3-propanesultone was added to the electrolyte. The effect of suppressing the rise of resistance at 60 degrees C was particularly remarkable. Additionally, the capacity maintenance ratio of each of the batteries of these examples showed a remarkable improvement relative to that of the battery of Comparative Example 6.

What is claimed is:

1. A non-aqueous electrolyte containing an aprotic solvent and a disulfonic acid ester compound as expressed by chemical formula 1 shown below:

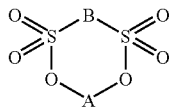

Chemical formula 1 where A and B respectively and independently represent alkylene groups having 1 to 5 carbon atoms and at least either A or B has an alkenyl group as substituent.

2. The non-aqueous electrolyte according to claim 1, further containing:
one or more than one compounds having a sulfonyl group in addition to the compound expressed by the chemical formula 1.

3. The non-aqueous electrolyte according to claim 2, wherein
the one or more than one compounds having a sulfonyl group include a compound expressed by chemical formula 2 shown below:

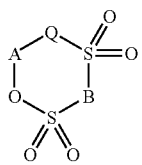

Chemical formula 2 where Q represents an oxygen atom, a methylene group or a single bond, A represents a group selected from a substituted or unsubstituted alkylene group having 1 to 5 carbon atoms, a carbonyl group, a sulfinyl group, a polyfluoroalkylene group having 1 to 5 carbon atoms, a substituted or unsubstituted fluoroalkylene group having 1 to 5 carbon atoms, a group formed by turning at least one of the C—C bonds of a substituted or unsubstituted alkylene group having 1 to 5 carbon atoms to a C—O—C bond, a group formed by turning at least one of the C—C bonds of a polyfluoroalkylene group having 1 to 5 carbon atoms to a C—O—C bond and a group formed by turning at least one of the C—C bonds of a substituted or unsubstituted fluoroalkylene group having 1 to 5 carbon atoms to a C—O—C bond, and B represents a group selected from a substituted or unsubstituted alkylene group having 1 to 5 carbon atoms, a polyfluoroalkylene group having 1 to 5 carbon atoms and a substituted or unsubstituted fluoroalkylene group having 1 to 5 carbon atoms.

4. The non-aqueous electrolyte according to claim 2, further containing:
a sultone compound expressed by chemical formula 3 shown below as one or more than one compounds having a sulfonyl group:

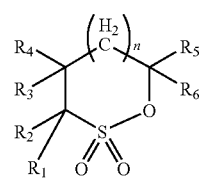

Chemical formula 3 where n represents an integer not smaller than 0 and not greater than 2, and each of R1 through R6 represents a hydrogen atom or a group selected from an alkyl group having not less than 1 and not more than 12 carbon atoms, a cycloalkyl group having not less than 3 and not more than 6 carbon atoms and an aryl group having not less than 6 and not more than 12 carbon atoms.

5. The non-aqueous electrolyte according to claim 4, further containing:
vinylene carbonate or a derivative thereof.

6. The non-aqueous electrolyte according to claim 2, further containing:
vinylene carbonate or a derivative thereof.

7. The non-aqueous electrolyte according to claim 1 containing:
a compound expressed by the above chemical formula 1 by not less than 0.005 mass % and not more than 10 mass % of the entire electrolyte.

8. The non-aqueous electrolyte according to claim 1, wherein
the aprotic solvent contains one or more solvents selected from a group of cyclic carbonates, linear chain carbonates, aliphatic carboxylic acid esters, γ-lactones, cyclic ethers, linear chain ethers and fluorine derivatives of any of them.

9. The non-aqueous electrolyte according to claim 1, further containing:
as lithium salt one or more than one compounds selected from a group of $LiPF_6$, $LiBF_4$, $LiAsF_6$, $LiSbF_6$, $LiClO_4$, $LiAlCl_4$ and $LiN(C_nF_{2n+1}SO_2)(C_mF_{2m+1}SO_2)$ (where n and m are natural numbers).

10. A non-aqueous electrolyte secondary battery comprising a non-aqueous electrolyte containing an aprotic solvent and a disulfonic acid ester compound as expressed by chemical formula 1 shown below, a positive electrode and a negative electrode:

Chemical formula 1

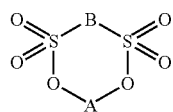

where A and B respectively and independently represent alkylene groups having 1 to 5 carbon atoms and at least either A or B has an alkenyl group as substituent.

11. The secondary battery according to claim 10, wherein the positive electrode active substance of the positive electrode contains a lithium-containing complex oxide that can occlude and discharge lithium.

12. The secondary battery according to claim 11, wherein the lithium-containing complex oxide has a lithium-manganese complex oxide having a spinel structure.

13. The secondary battery according to claim 10, wherein the negative electrode active substance of the negative electrode contains one or more substances selected from a group of materials that can occlude and discharge lithium and oxide materials.

14. The secondary battery according to claim 13, wherein the negative electrode active substance contains a carbon material.

15. The secondary battery according to claim 14, wherein the carbon material is graphite.

16. The secondary battery according to claim 14, wherein the carbon material is amorphous carbon.

\* \* \* \* \*